United States Patent [19]

Iwasaki et al.

[11] 4,210,946
[45] Jul. 1, 1980

[54] MAGNETIC RECORDING MEDIUM

[75] Inventors: Shun-Ichi Iwasaki, 1-11-35 Kunimi, Sendai-shi, Miyagi-ken; Yoshihisa Nakamura, Izumi, both of Japan

[73] Assignees: Sony Corporation, Tokyo; Fujitsu Limited, Kanagawa; Shun-Ichi Iwasaki, Miyagi, all of Japan

[21] Appl. No.: 943,749

[22] Filed: Sep. 19, 1978

[30] Foreign Application Priority Data

Sep. 30, 1977 [JP] Japan .................................. 52-118424

[51] Int. Cl.² .............................................. G11B 5/66
[52] U.S. Cl. ..................................... 360/131; 428/900; 428/212; 427/131
[58] Field of Search ................ 360/134, 131; 428/900, 428/212; 427/131, 132

[56] References Cited

U.S. PATENT DOCUMENTS

| | | | |
|---|---|---|---|
| 3,052,567 | 9/1962 | Gabor et al. | 360/131 X |
| 3,116,159 | 12/1963 | Fisher et al. | 427/131 X |
| 3,185,775 | 5/1965 | Camras | 360/131 |
| 3,328,195 | 6/1967 | May | 360/131 X |
| 4,024,489 | 5/1977 | Bajorek et al. | 428/900 X |
| 4,075,384 | 2/1978 | Suzuki et al. | 428/900 |
| 4,075,672 | 2/1978 | Manly | 360/135 |
| 4,079,169 | 3/1978 | Nigh et al. | 360/134 X |

FOREIGN PATENT DOCUMENTS

| | | | |
|---|---|---|---|
| 2402481 | 7/1974 | Fed. Rep. of Germany | 427/131 |
| 2512456 | 7/1976 | Fed. Rep. of Germany | 427/131 |
| 1427724 | 3/1976 | United Kingdom | 427/131 |
| 1427731 | 3/1976 | United Kingdom | 427/132 |

*Primary Examiner*—John H. Wolff
*Attorney, Agent, or Firm*—Lewis H. Eslinger; Alvin Sinderbrand

[57] ABSTRACT

A magnetic recording medium suitable for use in a recording system employing a magnetic recording transducer or head of the single-pole type which operates in a perpendicular magnetization mode comprises a non-magnetic base supporting a layer of low coercive force material formed on the base and which underlies a magnetic recording layer. The magnetic recording layer which faces the magnetic recording transducer or head is formed of an alloy composed mainly of chromium and cobalt and has an easy axis of magnetization perpendicular to the surface of the magnetic recording layer, with the thickness of the latter being no greater than 3.0 microns. The low coercive force material layer has a coercive force no greater than 1/5 of the coercive force of the magnetic recording layer, and the thickness of the low coercive force layer is greater than 0.1 microns.

15 Claims, 11 Drawing Figures

MAGNETIC RECORDING MEDIUM

BACKGROUND OF THE INVENTION

1. Field of the Invention

This invention relates generally to a magnetic recording medium, and more particularly is directed to an improved magnetic recording medium which is suitable for the recording of signals thereon by so-called perpendicular magnetization.

2. Description of the Prior Art

In conventional magnetic recording, for example, as employed in magnetic tape or sheet recorders and the like, the audio, video or other signals are recorded on a magnetic recording layer formed on a non-magnetic base by magnetizing such layer mainly in a longitudinal direction which is parallel to the direction of relative movement of the magnetic tape or sheet in respect to a ring-type magnetic transducer or head used for recording. When recording in such longitudinal magnetization mode, increasing the recording density, that is, the density of signals recorded on the tape or sheet, correspondingly reduces the wavelength of the recorded signal, with the result that the demagnetizing field in the magnetic recording layer is increased. Increasing the demagnetizing field causes attenuation and rotation of the residual magnetization, with the result that a reduced output is obtained when reproducing or playing back the recorded signals. On the contrary, if signals are recorded by magnetizing the magnetic recording layer in the direction normal to the surface thereof, that is, in the so-called perpendicular magnetization mode, decreasing the wavelength of the recorded signal, as by increasing the recording density, causes a reduction in the demagnetizing field. Therefore, it will be appreciated that, for recording a signal of short wavelength, recording in the perpendicular magnetization mode (hereinafter referred to as perpendicular recording) is more advantageous than the conventional recording in the longitudinal magnetization mode (hereinafter referred to as longitudinal recording).

Although various recording media have been proposed for use in connection with perpendicular recording, such recording media have not been effective, in practice, to achieve the full advantages of perpendicular recording. One recording medium heretofore proposed for perpendicular recording has been disclosed by the present inventors in the "Proceedings of the Seventh Annual Conference on Magnetics", Paper No. 4pA-7, 1975, Japan, in the "Proceedings of the 1976 Annual Meeting of the Institute of Electronics and Communication Engineers of Japan", Paper No. 184, 1976, Japan, and also in Japanese Patent Application No. 51574/1976 (which is also identified as Published Unexamined Application No. 134,706/77). Such magnetic recording medium intended for use in perpendicular recording has a magnetic recording layer with a direction of easy magnetization perpendicular to the surface of the recording layer, that is, in the direction of the thickness thereof. The magnetic recording layer having a direction of easy magnetization perpendicular to the surface thereof is made of a chromium-cobalt (Cr—Co) alloy which is formed directly on a non-magnetic base or carrier by radio frequency sputtering. Although the magnetic recording layer of chromium-cobalt alloy exhibits magnetic characteristics which favor the recording of signals therein by perpendicular magnetization rather than by longitudinal magnetization, the relatively high coercive force of the chromium-cobalt alloy makes it rather difficult to record signals on the magnetic recording layer thereof until such layer has been saturated by the single-pole magnetic transducer or head used for the perpendicular recording. Therefore, relatively great electrical power is required for the recording operation.

In order to overcome the above-mentioned problems associated with a recording medium for perpendicular recording which consists only of a magnetic recording layer of chromium-cobalt alloy on a non-magnetic base, the present inventors have further proposed, for example, as disclosed in Japanese Patent Application No. 51574/1976 (also identified as Published Unexamined Patent Application No. 134706/77) and No. 106506/1976 (also identified as Published Unexamined Patent Application No. 32009/78), a magnetic recording head capable of effecting efficient perpendicular recording with a relatively low magneto-motive force, and which includes, in addition to the single-pole facing the surface of the recording medium defined by the magnetic-recording layer, an excited auxiliary magnetic pole which faces the other side or exposed surface of the non-magnetic base of the magnetic recording medium. Although such magnetic heads for perpendicular recording are effective in some circumstances, for example, when the recording medium is a magnetic tape or sheet having a thin non-magnetic base, it is difficult to employ such magnetic heads for the recording of signals on magnetic discs or the like which have a relatively thick non-magnetic base.

OBJECTS AND SUMMARY OF THE INVENTION

Accordingly, it is an object of the present invention to provide a magnetic recording medium suitable for use in perpendicular recording and which is effective to overcome the above-described disadvantages of existing magnetic recording media proposed for that purpose.

Another object is to provide a magnetic recording medium which is particularly suited for high-density perpendicular recording.

A further object is to provide a magnetic recording medium for perpendicular recording, as aforesaid, in which the signal recording may be carried out by a single pole-type magnetic recording head.

Generally, in accordance with this invention, a magnetic recording medium suitable for perpendicular recording comprises a magnetic recording layer formed of a chromium-cobalt alloy and having an easy axis of magnetization substantially perpendicular to the surface of the magnetic recording layer, and a layer of a low-coercive force material which is interposed between the magnetic recording layer and a non-magnetic base which supports both the magnetic recording layer and the low-coercive force material layer.

In preferred embodiments of the invention, the chromium-cobalt alloy forming the magnetic recording layer contains from 5 to 25 weight percent chromium and has a thickness no greater than 3.0 microns ($\mu$m), while the layer of a low-coercive force material has a thickness at least equal to 0.1 micron and a coercive force no greater than 1/5 that of the magnetic recording layer.

The above, and other objects, features and advantages of the invention, will be apparent in the following detailed description of illustrative embodiments thereof which is to be read in connection with the accompanying drawings.

DESCRIPTION OF PREFERRED EMBODIMENTS

Figures 1, 2:
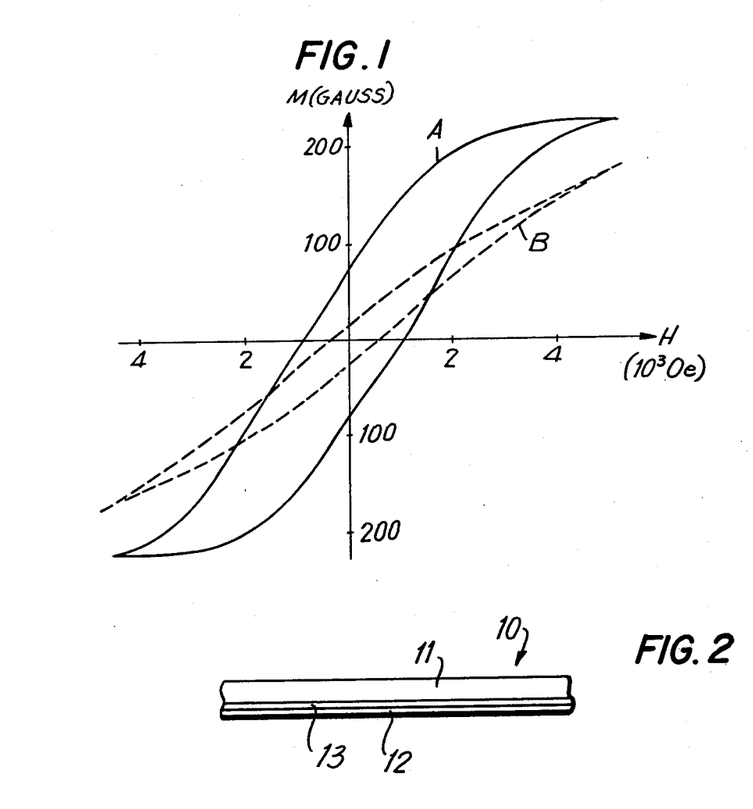
FIG. 1 is a graph showing magnetic charcteristics of a magnetic recording layer formed of a chromium-cobalt alloy.
FIG. 2 is an enlarged, fragmentary side elevational view of a magnetic recording medium according to an embodiment of the present invention.

Referring to the drawings in detail, and initially to FIG. 1 thereof, it will be seen that a magnetic-recording layer of chromium-cobalt alloy formed on a non-magnetic base or carrier, for example, by radio frequency sputtering, has a magnetic characteristic representing the relationship between the magnetic field H and magnetization M of the recording layer in the perpendicular direction represented by the curve A in solid lines, while the corresponding magnetic characteristic in the longitudinal direction is represented by the curve B in broken lines. As is apparent from FIG. 1, the maximum residual magnetization of the magnetic recording layer is substantially larger in respect to magnetization in the direction perpendicular to the surface of the magnetic recording layer than in respect to magnetization in the longitudinal direction with the result that the magnetic recording layer of the chromium-cobalt alloy may be considered to have magnetic characteristics that are favorable for a perpendicular recording medium. However, when perpendicular recording is effected by means of a single-pole magnetic head, for example, a head as shown on any one of FIGS. 3, 5 and 6 and hereinafter described in detail, it is rather difficult to effect perpendicular recording of signals on the chromium-cobalt alloy layer having a relatively high coercive force until such layer has been saturated by the recording head. Although the need for such saturation can be avoided, whereby to permit perpendicular recording with a relatively low magneto-motive force, by the use of a single-pole magnetic recording head provided with an auxiliary-magnetic pole at the side of the magnetic recording medium opposite to that defined by the magnetic recording layer, for example, as hereinafter described in detail with reference to FIG. 4, such a magnetic head cannot be readily employed for perpendicular recording of signals on a magnetic recording disc or the like which has a relatively thick non-magnetic base or carrier supporting the chromium-cobalt alloy layer.

Referring now to FIG. 2, it will be seen that, in a magnetic recording medium 10 embodying this invention, the above-described problems encountered in the use of a magnetic recording medium consisting of a non-magnetic base 11 and a magnetic recording layer 12 for perpendicular recording are avoided by interposing therebetween a layer 13 of a low-coercive force material. In such magnetic recording medium 10 according to this invention, it appears that, during the perpendicular recording by means of a single-pole magnetic head, an image of the magnetization of the head is produced in the low-coercive force material of layer 13 and acts to enhance the recording magnetic field produced by the single-pole magnetic head. Further, it appears that the low-coercive force material layer 13 forms a partially closed magnetic circuit at the back side of the chromium-cobalt alloy layer 12, that is, at the side of the layer 12 facing away from the recording head, so as to reduce the demagnetizing field of the magnetic recording layer 12 and thereby to enhance the residual magnetization of such layer 12.

In a magnetic recording medium according to this invention, the magnetic recording layer 12 is preferably made of a chromium-cobalt alloy containing from 5 to 25 weight percent of chromium. The thickness of layer 12 is no greater than 3.0 microns, and preferably from 0.1 to 3.0 microns, with the most preferred thickness of layer 12 being from 0.5 to 3.0 microns. The layer 12 of chromium-cobalt alloy has its easy axis of magnetization in the direction perpendicular to the surface of layer 12, and its saturation magnetization $M_s$ is selected to be between 100 and 1,100 G (Gausses) while its coercive force $H_c$ is selected to be between 300 and 2,000 $O_e$ (Oersteds).

In connection with the above-stated preferred characteristics of magnetic recording layer 12, it is to be noted that cobalt has a large crystalline magnetic anisotropy constant $K_u$. However, if chromium is added to cobalt, the saturation magnetization $M_s$ of the resulting alloy is decreased and the easy magnetization axis of direction of a layer thereof becomes perpendicular to the surface of the layer. If the saturation magnetization $M_s$ of the magnetic recording layer is less than 100 Gausses, that is, less than the lower limit of the above-indicated range therefor, the reproduced output resulting from playback of signals recorded on such layer is insufficient. On the other hand, if the saturation magnetization $M_s$ exceeds 1100 Gausses, the easy axis of magnetization of the chromium-cobalt alloy layer is oriented substantially in the longitudinal direction and, therefore, perpendicular magnetization cannot be effected. It has been found that a chromium-cobalt alloy containing from 5 to 25 weight percent of chromium provides a magnetic recording layer 12 having its saturation magnetization $M_s$ between 100 and 1100 Gausses which, in turn, results in the easy axis of magnetization being perpendicular to the surface of layer 12, particularly when the latter is backed by the layer 13 of low-coercive force material. When the saturation magnetization $M_s$ of layer 12 is selected to be within the range of 100 to 1100 Gausses, the coercive force $H_c$ of such layer is found to be in the indicated range between 300 and 2000 Oersteds, respectively.

If the thickness of the chromium-cobalt alloy layer 12 is too small, it is difficult to effect the perpendicular magnetization thereof with the result that a low or insufficient reproduced output is obtained upon playback of the recorded signals. Therefore, as previously indicated, the minimum thickness of the magnetic recording layer 12 is at least 0.1 microns and preferably at least 0.5 microns. On the other hand, if the thickness of magnetic recording layer 12 is too large, it becomes difficult for the magnetic recording field to penetrate the same and, therefore, an excessive electromotive force or power is required for recording. Thus, as mentioned, the preferred maximum thickness of magnetic recording layer 12 is 3.0 microns.

The low-coercive force material layer 13 provided in the magnetic recording medium 10 in accordance with this invention preferably has a coercive force no greater than 1/5 of the coercive force of the magnetic recording layer 12, and which is preferably no greater than 300 Oersteds. The thickness of layer 13 is at least 0.1 microns, and preferably at least 0.5 microns and preferably no more than 3.0 microns. If the thickness of the low coercive force material 13 is too small, for example, less than the preferred minimum thickness of 0.5 microns and particularly less than the minimum thickness of 0.1 microns, no appreciable improvement is realized in the recording sensitivity or in the reproduced output obtained upon playback of recorded signals. On the other hand, if the low coercive force material layer 13 is provided with a thickness greater than 3.0 microns, further improvements in recording sensitivity and reproduced output are not realized therefrom and the resulting increased costs of the material of layer 13 and of applying the same do not have commensurate benefits.

If the value of the coercive force of layer 13 is too great, for example, greater than 300 Oersteds, or greater than 1/5 the coercive force of the magnetic recording layer 12, the previously-mentioned formation of an image of the magnetization of the single-pole magnetic head is disturbed and, hence, the recording sensitivity is decreased and increased power is required for the signal recording operation.

The layer 13 of low-coercive force material may be formed by the radio frequency sputtering of an alloy of nickel, iron and molybdenum, in which the amount of molybdenum is from about 5 to 8 weight percent and the balance of the alloy is iron and nickel in the proportion of one to four, by weight. Alternatively, the layer 13 of low-coercive force material may be formed of a heat treated nickel-phosphorus alloy or of any other suitable material, such as, cobalt, which satisfies the particular physical characteristics stated above for the layer 13.

The non-magnetic base 11 of magnetic recording medium 10 according to this invention may be formed of a synthetic resin film, for example, of polyimide, polyethylene terephthalate, polycarbonate, and the like. Alternatively, the non-magnetic base 11 may be of a rigid plate or sheet, for example, of aluminum, copper, glass or the like.

The production of magnetic recording media according to the invention will be further illustrated with reference to a specific example thereof.

EXAMPLE

The non-magnetic base 11 of magnetic recording medium 10 is constituted by a polyimide film which is washed for removal of grease therefrom and then dried prior to the application thereto of the low-coercive force material layer 13. The layer 13 is applied to base film 11 by sputtering in a vacuum of $1.5 \times 10^{-7}$ torr, with an argon pressure of $2.2 \times 10^{-2}$ torr., and with a high frequency electric power of 650 W. while the temperature of the film or base 11 is maintained at 250° C. The layer 13, as thus formed, has a coercive force $H_c$ of about 5 Oersteds and a saturation magnetization $M_s$ of about 600 Gausses. The thickness of the layer 13 is dependent on the length of time during which the sputtering thereof is continued. Thus, when the sputtering is performed for about 20 minutes, the resulting layer 13 has a thickness of 1 micron and, of course, the thickness of layer 13 may be increased or decreased by suitably changing the time of sputtering. The magnetic recording layer 12 is formed by chromium-cobalt alloy and is applied over layer 13 also by sputtering. Such sputtering of the magnetic recording layer 12 is also carried out in a vacuum of $1.5 \times 10^{-7}$ torr. and an argon pressure of $2 \times 10^{-2}$ torr., with a high-frequency electric power of 200 W. The thickness of the chromium-cobalt alloy layer 12 is also determined by the time during which sputtering thereof is effected. Thus, for example, if sputtering of layer 12 continues for about 1 hour under the above conditions, layer 12 has a thickness of about 1 micron.

As is shown in the below Table I, the foregoing procedure was repeated to provide samples $S_1$–$S_5$ according to this invention in which the magnetic recording layer 12 is of an alloy containing the various indicated proportions of chromium and cobalt, and the low coercive force material of layer 13 is of the previously-mentioned nickel-iron-molybdenum alloy containing 5 to 8 weight percent of molybdenum and the balance of iron and nickel in the weight ratio of about 1 to 4, with the thickness of the layer 13 being varied as indicated on the table. An additional sample $S_b$ according to this invention is similarly produced, but has its low coercive force material layer 13 formed of cobalt. Finally, as indicated at $S_c$ on Table I, a recording medium was similarly produced, but without the low-coercive force material layer characteristic of this invention, for the purpose of providing a basis of comparison.

Table 1

| | Magnetic Recording Layer (12) | | | | Low Coercive Force Material Layer (13) | | | |
|---|---|---|---|---|---|---|---|---|
| Specimen | Material (weight %) | Thickness (micron) | Saturation Magnetization Ms (gauss) | Coercive Force Hc (Oersted) | Material | Thickness (micron) | Saturation Magnetization Ms (gauss) | Coercive Force Hc (Oersted) |
| $S_1$ | 82Co-18Cr | 1.0 | 390 | 1500 | Ni-Fe-Mo | 2.0 | 600 | 5 |
| $S_2$ | 82Co-18Cr | 1.0 | 390 | 1500 | Ni-Fe-Mo | 1.0 | 600 | 5 |
| $S_3$ | 82Co-18Cr | 1.0 | 390 | 1500 | Ni-Fe-Mo | 0.5 | 600 | 5 |
| $S_4$ | 95Co-5Cr | 1.0 | 1000 | 840 | Ni-Fe-Mo | 1.0 | 600 | 5 |

Table 1-continued

| | Magnetic Recording Layer (12) | | | | Low Coercive Force Material Layer (13) | | | |
|---|---|---|---|---|---|---|---|---|
| Specimen | Material (weight %) | Thickness (micron) | Saturation Magnetization Ms (gauss) | Coercive Force Hc (Oersted) | Material | Thickness (micron) | Saturation Magnetization Ms (gauss) | Coercive Force Hc (Oersted) |
| $S_5$ | 78Co-22Cr | 1.0 | 150 | 780 | Ni-Fe-Mo | 1.0 | 600 | 5 |
| $S_6$ | 81Co-19Cr | 1.0 | 340 | 1300 | Co | 0.9 | 1400 | 100 |
| $S_c$ | 82Co-18Cr | 1.0 | 390 | 1500 | | | | |

The perpendicular recording of signals on the magnetic recording media according to this invention may be effected by various magnetic transducers or heads having a main magnetic pole of the single-pole type. As shown on FIG. 3, one such magnetic transducer or head 14 suitable for use in the perpendicular recording of signals on recording medium 10 may comprise a core 15, for example, of a plated permalloy film having a thickness t and length L to serve as a main magnetic pole at the center of head 14, and cores 16 and 17, for example, of nickel-zinc ferrite or of manganese-zinc ferrite, which are of a width T and disposed at opposite side of core 15 to avoid magnetic saturation of the latter. In the case of the single-pole magnetic head 14 of FIG. 3, cores 16 and 17 have bevelled ends facing toward record medium 10 and are longitudinally dimensioned so that central core or main magnetic pole 15 projects by the distance l beyond the bevelled ends of cores 16 and 17 in the direction toward the record medium. Finally, as shown in FIG. 3, magnetic head 14 includes an excitation winding 18 which is wound around the cores 15, 16 and 17 and is adapted to receive the signal to be recorded.

Figure 3:
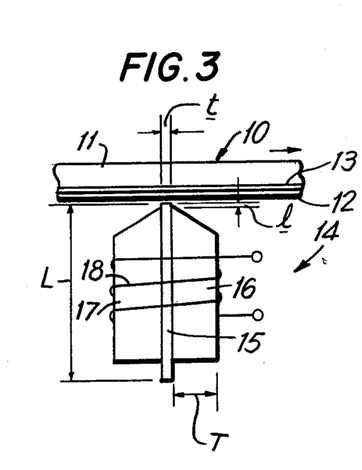
FIGS. 3, 4, 5 and 6 are schematic views illustrating respective magnetic recording heads that may be employed for perpendicular recording of signals on a magnetic recording medium according to this invention.
Figure 8:
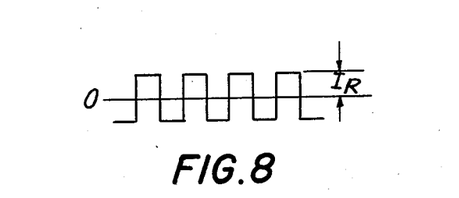
FIG. 8 is a waveform diagram illustrating the signal recorded to obtain the input to output characteristics of FIG. 7.

In comparing the characteristics of the magnetic recording media according to this invention, for example, as typified by samples $S_1$–$S_6$, with the characteristics of a magnetic recording medium according to the prior art, for example, as typlified by the medium $S_c$, the magnetic recording head 14 of FIG. 3 is used for recording and is provided with the following dimensions: L=1.5mm, l=100 microns, T=700 microns, t=1.6 microns, and winding 18 has 100 turns. During recording of each magnetic recording medium, the latter is moved relative to the magnetic head at a speed of 9.5 cm/sec., while applying to excitation winding 18 of the recording head a rectangular signal of 200 BPI (that is, 200 bits per inch) which is twice the number of cycles per inch intended to be shown on FIG. 8. After such rectangular signal is perpendicularly recorded on the magnetic recording media by means of the described single-pole type magnetic head 14, the reproducing or playback of the record signals is effected by an ordinary ring-type magnetic head having a gap length of 1.0 microns, with the relative speed of each magnetic recording medium in respect to the reproducing head again being 9.5 cm/sec.

Figure 7:
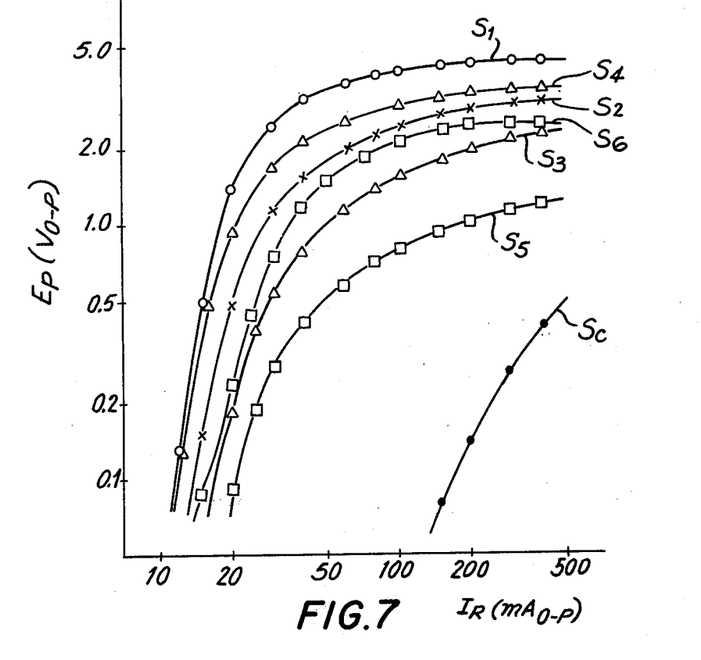
FIG. 7 is a graph showing the input to output characteristics of various magnetic recording media according to the present invention in comparison with the input to output characteristic of a magnetic recording medium according to the prior art.

The input-output characteristic curves for the various magnetic recording media $S_1$—$S_6$ according to this invention and for the prior are recording media $S_c$ provided for purposes of comparison are represented by the correspondingly identified curves $S_1$–$S_6$ and $S_c$ on FIG. 7. It will be seen that, on FIG. 7, the abscissa represents the value of the current of the input signal $I_R$ of FIG. 8 which is recorded and is measured from the zero level to the peak level thereof, while the ordinate represents the voltage $E_R$ measures from the zero level to the peak value of the reproduced voltage which is obtained by amplifying the output of the ring-type reproducing head with a gain of 60 dB. It will be apparent from a comparison of the curve identified at $S_c$ with the curves identified at $S_1$–$S_6$ on FIG. 7, that the magnetic recording media according to this invention, that is, in which the magnetic recording layer 12 is backed by a layer 13 of a low-coercive force material, all having recording characteristics that are far superior to the magnetic recording media of the prior art in which the layer 13 of low-coercive force material is omitted. As is apparent from the curve $S_c$ on FIG. 7, within the practical range of the input current $I_R$, in the case of the magnetic recording medium according to the prior art, that is, the medium from which the layer 13 of low-coercive force material is omitted, there is no saturation of the reproduced output from such recording medium when recording of the latter is effected with the head 14.

As is apparent from a comparison of the curves $S_1$, $S_2$ and $S_3$ on FIG. 7, the output resulting from reproductin of signals recorded on media in accordance with this invention is improved with increasing of the thickness of the low-coercive force material layer 13 at least from 0.5 microns (curve $S_3$) through 1.0 microns (curve $S_2$) to 2.0 microns (curve $S_1$). However, as previously indicated, it has been ascertained that, when the thickness of layer 13 is increased beyond about 3.0 microns, no further improvement or increase in the output characteristic is obtained and, conversely, when the thickness of the low-coercive force material layer 13 is smaller than 0.1 microns, such layer 13 has almost no affect on the output that can be obtained from the magnetic recording medium.

Although FIG. 7 shows the input-output characteristics of magnetic recording media according to this invention in the case where recording of effected by means of the single-pole magnetic head 14 shown on FIG. 3, similarly improved input-output characteristics are obtained with magnetic recording media according to this invention when perpendicular recording thereof is effected by other types or sizes of magnetic heads. More particularly, on FIG. 9, the curve $S_2$ is seen to be the same as the curve $S_2$ on FIG. 7 and similarly represents the input-output characteristic of the magnetic recording medium sample $S_2$ on Table I when signals are recorded thereon as previously described by means of the single-pole magnetic head 14. Similarly, curves $H_2$ and $H_3$ on FIG. 9 respectively represent the input-output characteristics of the same magnetic recording medium, that is, sample $S_2$ of Table I, when recording of the same is effected by the single-pole magnetic heads 14a and 14b illustrated on FIGS. 4 and 5, respectively.

Figure 4:
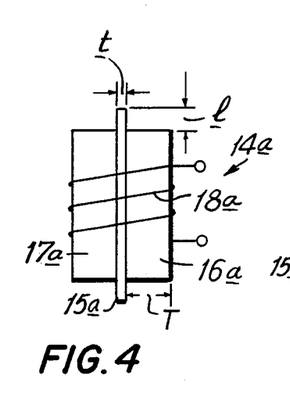

The magnetic recording head 14a is shown to be generally similar to the previously described head 14 and differs substantially from the latter only in that the cores 16a and 17a of nickel-zinc ferrite or manganese-zinc ferrite disposed at opposite sides of the central plated permalloy film serving as the main magnetic pole 15a are not bevelled at the ends thereof facing in the direction toward the magnetic recording medium (not shown on FIG. 4). In the case of the magnetic head 14a, the main magnetic pole 15a at the center of the head has a thickness t=1.6 microns and projects by a distance l=500 microns toward the magnetic recording medium beyond the adjacent ends of the cores 16a and 17a which each have a thickness T=700 microns. Finally, in the magnetic head 14a, the cores 15a, 16a and 17a are again all embraced by an excitation or recording winding 18a with 100 turns.

Figure 5:
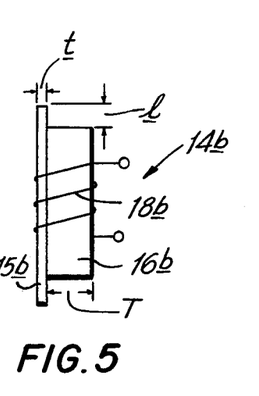

In the case of the magnetic head 14b shown on FIG. 5, the main magnetic pole 15b is again constituted by a plated permalloy film of a thickness t=1.6 microns and projecting, at one end, by the distance l=500 microns in the direction toward the magnetic recording medium (not shown on FIG. 5) beyond the adjacent end of a single additional core 16b of nickel-zinc ferrite or manganese-zinc ferrite having a thickness T=700 microns for avoiding magnetic saturation of the main magnetic core or pole 15b. The main magnetic pole 15b and the single additional core 16b are embraced by an excitation or recording winding 18b which again has 100 turns.

Figure 6:
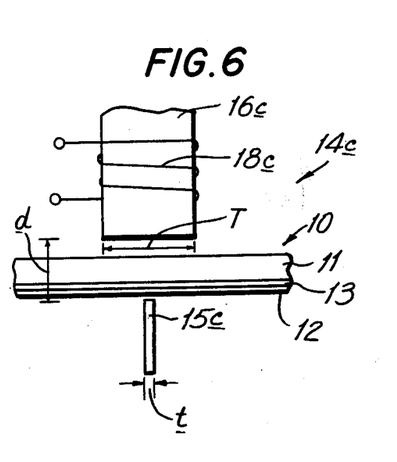
Figure 9:
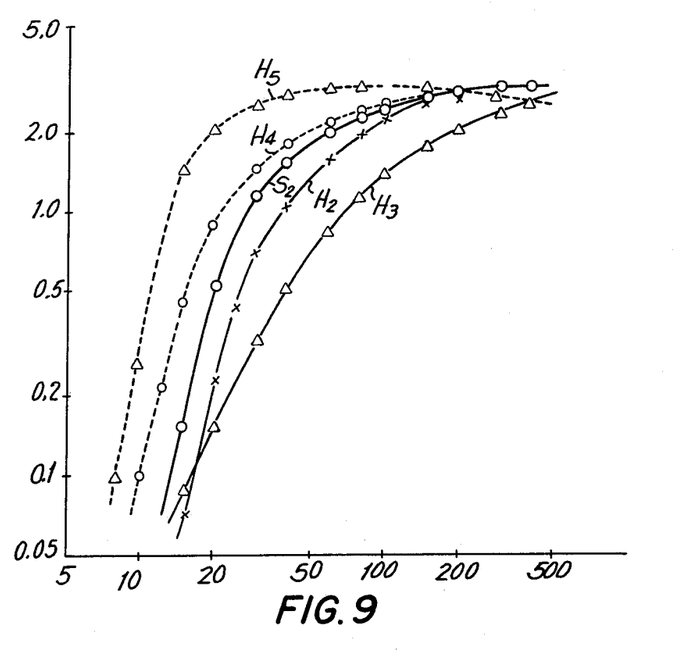
FIG. 9 is a graph similar to that of FIG. 7, but showing the input to output characteristics of a magnetic recording medium according to this invention when perpendicular recording is effected therein by means of various different magnetic recording heads.

Returning to FIG. 9, it will be seen that the curves H4 and H5 thereon represent the input-output characteristics of the magnetic recording medium previously identified as sample S2 of the present invention when signals are recorded on such medium by means of magnetic recording heads of the type indicated at 14c on FIG. 6. Each such magnetic recording head 14c is shown to include a main magnetic pole 15c of a thickness t located at one side of the path of movement of the recording medium 10 so as to confront the magnetic recording layer 12 thereof, and an auxiliary magnetic pole 16c spaced by the distance d from the main magnetic pole 15c so as to be disposed at the opposite side of the recording medium, and having the excitation or recording winding 18c wound thereon. The magnetic heads used for recording signals on the magnetic recording medium when measuring the input-output characteristics represented by curves H4 and H5 on FIG. 9 are dimensionally similar in that, in each case, the thickness T of the auxiliary magnetic pole is 700 microns, the excitation winding 18c is constituted by 100 turns, and the distance d between the auxiliary magnetic pole 16c and the main magnetic pole 15c is 100 microns. However, in the magnetic recording head 14c used for developing the input-output characteristic represented by the curve H4, the thickness t of the main magnetic pole 15c is 1.6 microns, whereas the curve H5 represents the input-output characteristic when the thickness t of the main magnetic pole 15c is 3.2 microns.

Figures 10, 11:
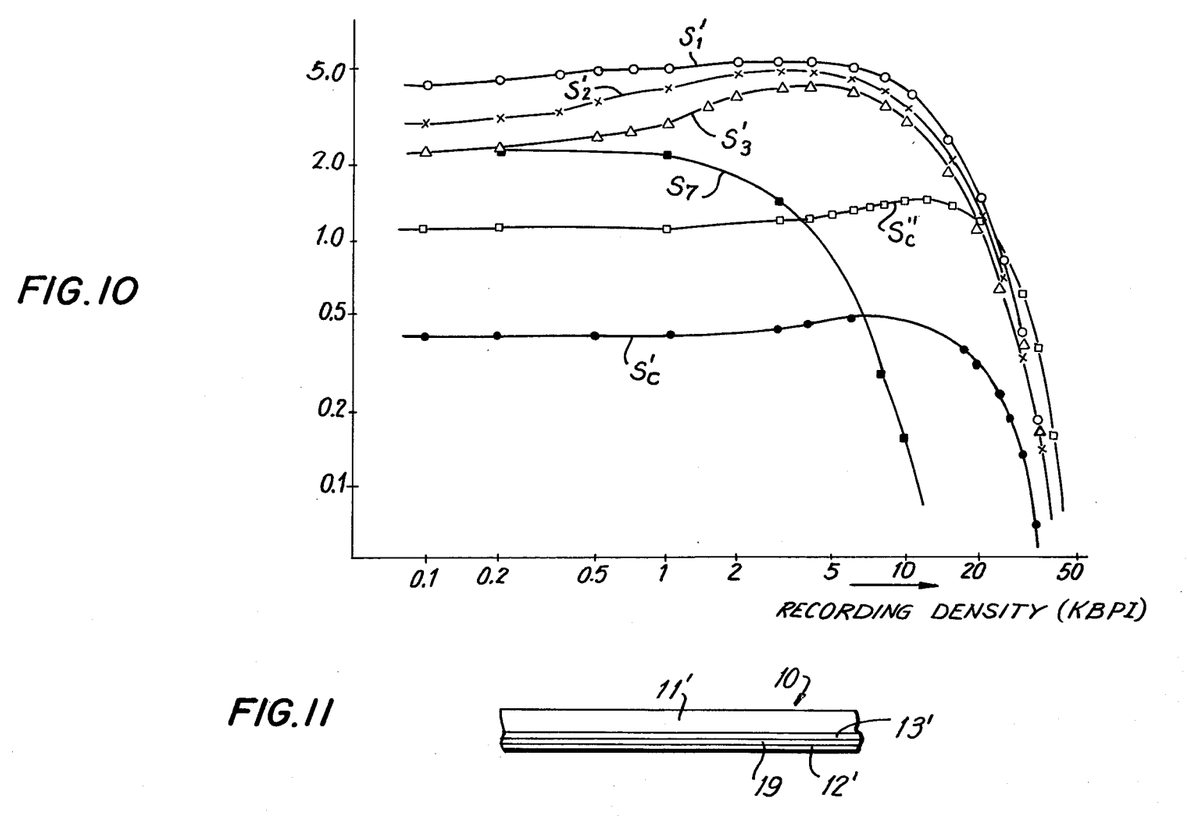
FIG. 10 is a graph showing the frequency-response characteristics of various magnetic recording media embodying the invention in comparison with the frequency-response characteristics of magnetic recording media according to the prior art.
FIG. 11 is a fragmentary enlarged side view of a magnetic recording medium according to another embodiment of this invention.

Referring now to FIG. 10, it will be noted that curves $S'_1$, $S'_2$ and $S'_3$ thereon represent the frequency response characteristics of the reproduced outputs from magnetic recording media according to this invention corresponding to samples $S_1$, $S_2$, $S_3$, respectively, on Table I. In measuring the frequency response characteristics illustrated on FIG. 10, the single-pole magnetic head 14a of FIG. 4 is employed for recording and a ring-type magnetic head with a gap length of 1.0 microns is again used for reproducing the recorded signals. On FIG. 10, the abscissa represents the recording density of KBPI, that is, thousands of bits per inch, which if course corresponds to the frequency of the recorded signal for the case where the speed of movement of the recording medium is constant, for example, at 9.5 cm/sec. On FIG. 10, the ordinate again represents the reproduced voltage output $E_P$ which is the difference between the zero level and peak value of the reproduced voltage obtained by amplifying the output of the ring-type reproducing head with a gain of 60 dB.

For purposes of comparison, the curve $S'_c$ on FIG. 10 represents the similarly measured frequency response characteristic for a magnetic recording medium according to the prior art sample $S_c$ on Table I, that is, a magnetic recording medium which does not have the low-coercive force material layer 13 characteristic of the present invention. Further, on FIG. 10, the curve $S''_c$ also represents a measured frequency response characteristic of the prior art magnetic recording medium $S_c$ without the low-coercive force material layer 13, but for the case in which the recording of signals on such medium is effected by the magnetic recording head 14c of FIG. 6 in which its main magnetic pole 15c has a thickness t of 3.2 microns. Finally, on FIG. 10, the curve $S_7$ represents the measured frequency response characteristic of a conventional $\gamma$-Fe$_2$O$_3$ magnetic recording tape.

It will be apparent from FIGS. 7, 9 and 10 that the magnetic recording media according to the present invention have recording sensitivities, frequency characteristics and reproduced outputs that are superior to the corresponding characteristics of the magnetic recording media of the prior art.

In the above embodiments or samples of magnetic recording media according to this invention, the magnetic recording layer 12 has been shown to be formed directly on the layer 13 of low-coercive force material, as on FIG. 2. However, as shown on FIG. 11, in a magnetic recording medium 10′ according to this invention, an intermediate layer 19 of non-magnetic material may be interposed between the magnetic recording layer 12′ and the layer 13′ of low-coercive force material formed on a surface of the non-magnetic base 11′. In such magnetic recording medium 10′, the non-magnetic intermediate layer 19 may enhance the adhesion of the magnetic recording layer 12′, and may also avoid diffusion between the low-coercive force material of layers 13′ and the magnetic recording layer 12′. The non-magnetic intermediate layer 19 may be suitably formed of an insulating material, such as, Si O$_2$, Ti O$_2$, Al$_2$O$_3$ and the like, or of a metal, such as, titanium, chromium, aluminum, molybdenum, tungesten, copper, silver and the like.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording medium for the perpendicular recording of signals by a single-pole type magnetic recording head comprising:
   a first layer defining a surface of the medium adapted to confront the recording head and being formed of a chromium-cobalt alloy containing about 5 to 25 weight percent of chromium and having an easy axis of magnetization substantially perpendicular to said surface, with the thickness of said first layer being no greater than 3.0 microns;
   a second layer of a low coercive force magnetic material disposed at the side of said first layer facing away from said surface and having a coercive force no greater than one-fifth the coercive force of said first layer, with the thickness of said second layer being at least 0.1 microns; and supporting means disposed at the side of said second layer remote from said first layer and on which said first and second layers are supported.

2. A magnetic recording medium according to claim 1; wherein said supporting means comprises a non-magnetic base.

3. A magnetic recording medium according to claim 1; further comprising a third layer of non-magnetic material interposed between said first and second layers for improving adhesion of said first layer and avoiding diffusion between said first and second layers.

4. A magnetic recording medium according to claim 1; wherein said first layer has a coercive force from about 300 to 2000 Oersteds.

5. A magnetic recording medium according to claim 1; wherein said first layer has a saturation magnetization from about 100 to 1100 gauss.

6. A magnetic recording medium according to claim 1; wherein said second layer has a thickness in the range from about 0.1 to 3.0 microns.

7. A magnetic recording medium according to claim 1; wherein said second layer has a thickness in the range from about 0.5 to 3.0 microns.

8. A magnetic recording medium according to claim 1; wherein said first layer is sputtered coating of said alloy.

9. A magnetic recording medium comprising:

a first layer of a chromium-cobalt alloy containing from about 5 to 25 weight percent of chromium and having an axis of easy magnetization substantially perpendicular to a surface of said first layer, with the thickness of said first layer being no greater than 3.0 microns;

a second layer of a low coercive force material having a coercive force no greater than about one-fifth of the coercive force magnetic of said first layer and being disposed at the side of said first layer facing away from said surface of the latter, said second layer having a thickness of at least 0.1 microns; and a non-magnetic base at the side of said second layer remote from said first layer and carrying said first and second layers.

10. A magnetic recording medium according to claim 9; wherein said first layer has a coercive force from about 300 to 2000 Oersteds.

11. A magnetic recording medium according to claim 9; wherein said first layer has a saturation magnetization from about 100 to 1100 gauss.

12. A magnetic recording medium according to claim 9; wherein said second layer has a thickness from about 0.1 to 3.0 microns.

13. A magnetic recording medium according to claim 9; wherein said second layer has a thickness from about 0.5 to 3.0 microns.

14. A magnetic recording medium according to claim 9; further comprising a non-magnetic layer interposed between said first and second layers.

15. A magnetic recording medium according to claim 9; wherein said first layer is a sputtered coating of said alloy.

* * * * *